W. MONTFORT.
Car-Coupling.
No. 197,788.  Patented Dec. 4, 1877.
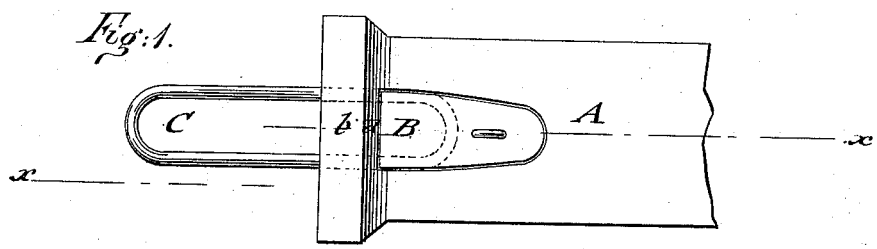
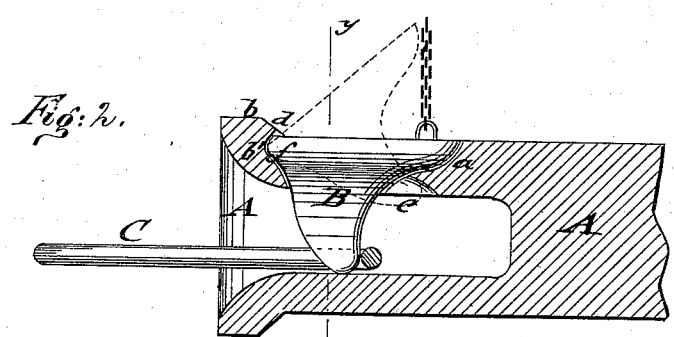
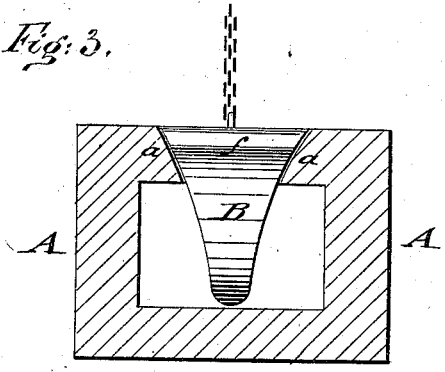
WITNESSES:  INVENTOR:
W. Montfort.
BY
ATTORNEYS.

UNITED STATES PATENT OFFICE.

WARREN MONTFORT, OF EMINENCE, KENTUCKY.

IMPROVEMENT IN CAR-COUPLINGS.

Specification forming part of Letters Patent No. 197,788, dated December 4, 1877; application filed August 11, 1877.

*To all whom it may concern:*

Be it known that I, WARREN MONTFORT, of Eminence, in the county of Henry and State of Kentucky, have invented a new and Improved Car-Coupling, of which the following is a specification:

In the accompanying drawings, Figure 1 is a top view; Fig. 2, a vertical longitudinal section on line $x\ x$, Fig. 1; and Fig. 3, a vertical transverse section on line $y\ y$, Fig. 2, of my improved car-coupling.

Similar letters of reference indicate corresponding parts.

The invention relates to an improved car-coupling that couples automatically the approaching link, and that can be uncoupled without displacing hook or pin, the coupling being constructed in simple and durable manner, and without the use of bolts, hinges, springs, or pivots, which are liable to get out of order.

By referring to the drawing, A represents the draw-head; B, the coupling drop hook or pin, and C the link of the same.

The draw-head A is provided with a top recess, $a$, that is made wider at the front than at the rear end, and tapering downward, so as to be narrower at the inside edge of the draw-head. The top shoulder $b$ of the draw-head A has a lateral recess, $b'$, on a level with the top of slot $a$, the recess forming a shoulder, $d$, that bears on the front end of the drop-hook B.

The rear end of recess $a$ is cut away or grooved at the inside of the draw-head, so as to form a seat, $e$, for the end of the drop-hook, when the same is raised for uncoupling.

The drop hook or pin B is made wider at the top and fitted into the recess of the draw-head. A projecting front part, $f$, fits in the groove of the front shoulder, and is retained therein. The lower part of the drop-pin is of curved and rounded-off hook shape, and rests on the bottom when in position for coupling.

The entering link pushes the hook back, raises the entire hook into inclined position, the front shoulder and groove acting as pivot, as shown in Fig. 2 in dotted lines, and finally drops by its own weight into the link, when the same has passed back of the hook, so as to couple the same. The front groove retains the drop-hook when in position for coupling, and the inside groove or seat prevents it from being lifted out of place or knocked out when in uncoupled position. A simple and effective car-coupling is thus furnished, in which no part gets detached, and which is, at any moment, ready for coupling, locking the link in reliable and automatic manner, and without the least danger to the brakeman.

I am aware that hook-shaped drop-pins extending into a slot in bottom of draw-head are not new; but by making a non-sliding front joint and a wedge shape to the pin, as well as to its seat, the strain is taken altogether on the said seat, and I am enabled to dispense with lugs, pivot-pins, and slot in bottom of draw-head.

Having thus described my invention, I claim as new and desire to secure by Letters Patent—

The hook-shaped drop-pin B, tapering downwardly, and having a front projection, $f$, in combination with a top-slotted draw-head having recess $b'$, overhanging shoulder $d$, and seat $e$, as and for the purpose specified.

WARREN MONTFORT.

Witnesses:
 THOS. W. RICE,
 J. M. BERRY.